United States Patent

[11] 3,623,512

[72] Inventors: Hans Ellwanger, Stuttgart; Herbert Trautewein, Ludwigsburg, both of Germany
[21] Appl. No.: 880,233
[22] Filed: Nov. 26, 1969
[45] Patented: Nov. 30, 1971
[73] Assignee: Robert Bosch GmbH, Stuttgart, Germany
[32] Priority: Nov. 29, 1968
[33] Germany
[31] G 68 09 162.3

[54] PRESSURE RESERVOIR
3 Claims, 1 Drawing Fig.
[52] U.S. Cl. .................................................. 138/30
[51] Int. Cl. .................................................. F16l 55/04
[50] Field of Search ...................................... 138/30, 26

[56] References Cited
UNITED STATES PATENTS

| | | | |
|---|---|---|---|
| 2,394,401 | 2/1946 | Overbeke | 138/30 |
| 3,066,699 | 12/1966 | Peet | 138/30 |
| 3,425,593 | 2/1969 | Kramer | 138/30 X |
| 3,477,473 | 11/1969 | Henry-Biabaud | 138/30 |

Primary Examiner—Herbert F. Ross
Attorney—Michael S. Striker

ABSTRACT: An upper gas chamber and a lower pressure fluid chamber separated from each other by a diaphragm deflectable in direction of the gas chamber in response to pressure fluid admitted into the lower chamber. The diaphragm comprises a peripheral portion which, by means of an annular element, is sealingly pressed against the inner wall of the reservoir. The annular element has an arcuately curved circumferential guide surface which faces towards the fluid pressure chamber such that upon admittance of a fluid pressure in this latter chamber the center portion of the diaphragm is deflected into the gas chamber whereby the peripheral portion contacts the guide surface of the annular element and is thereby arcuately deformed which avoids acute bending and consequent breaking of the peripheral portion.

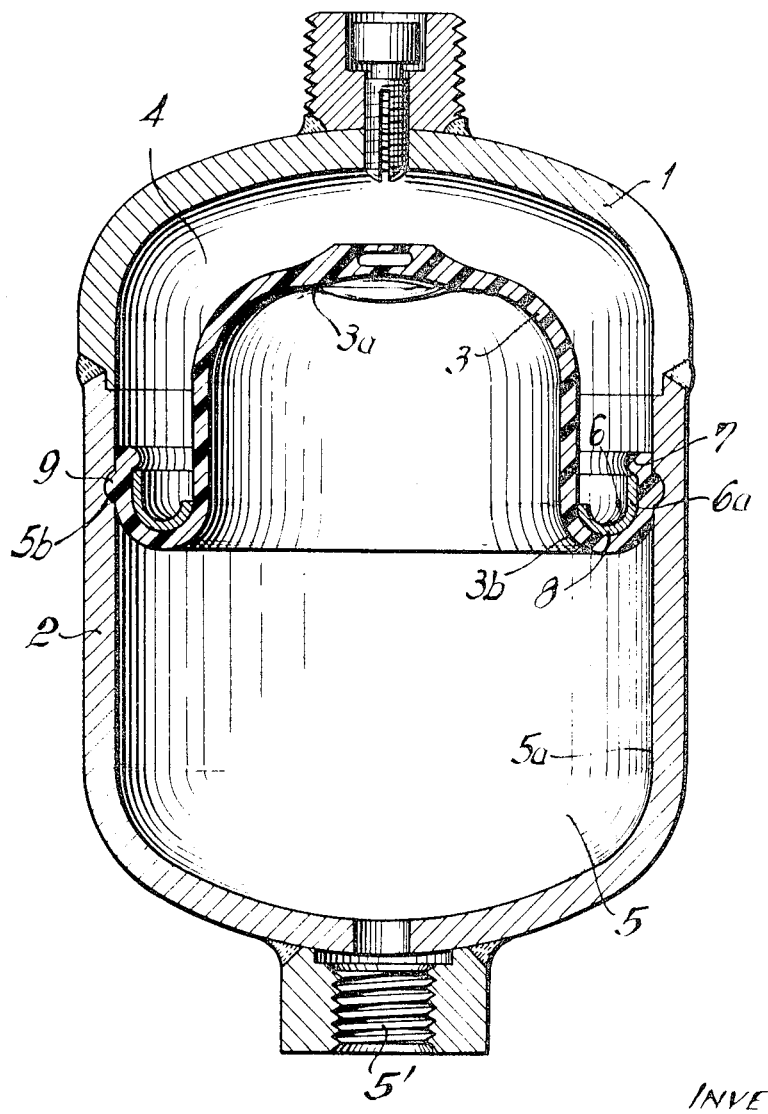

PRESSURE RESERVOIR

BACKGROUND OF THE INVENTION

The present invention in general relates to pressure reservoirs and more in particular to an improvement of such a reservoir and which incorporates a gas chamber and a pressure fluid chamber separated from each other by a deflectable diaphragm.

With pressure reservoirs of this type, the pressure fluid chamber is filled with a pressure fluid which causes the diaphragm to acutely deform through 180° about its outer periphery pressed against the inner wall of the reservoir. Such acute deformation of the diaphragm, however, usually leads to breakage of the diaphragm in the region of its periphery as a result of repeated acute bending of the diaphragm in this region.

In addition, the diaphragm material, at high temperatures, is subject to rapid embrittling which often accelerates breakage of the diaphragm.

SUMMARY OF THE INVENTION

It therefore is an object of the present invention to provide a pressure reservoir in which the diaphragm is arranged such that the above breakage of the same is avoided.

Such a pressure reservoir according to the invention comprises wall means defining a closed space with a diaphragm subdividing the enclosed space into an upper and a lower chamber and having a central portion and a peripheral portion in sealing engagement with the wall means. The center portion is arranged to be deflected into the upper chamber in response to admittance of pressure into the lower chamber.

Retaining the peripheral portion into engagement with the wall means is an annular element having an arcuately curved circumferential guide surface facing towards the lower chamber whereby upon admittance of fluid pressure into the lower chamber the peripheral portion contacts this guide surface and is arcuately deformed into conformance with the same to thereby avoid acute bending and breakage of the peripheral portion.

The novel features which are considered as characteristic for the invention are set forth in particular in the appended claims. The invention, itself, however, both as to its construction and its method of operation, together with additional objects and advantages thereof, will be best understood from the following description of specific embodiments when read in connection with the accompanying drawing.

BRIEF DESCRIPTION OF THE DRAWINGS

The single FIGURE of the drawings illustrates a cross-sectional view of a pressure reservoir embodied according to the present invention.

DESCRIPTION OF THE PREFERRED EMBODIMENTS

The single FIGURE illustrates a pressure reservoir which essentially consists of an upper part 1 and a lower part 2 which are joined and welded to each other.

Defined within the parts 1 and 2 is a hollow interior which is subdivided by a flexible diaphragm 3 into an upper gas chamber 4 and a lower pressure fluid chamber 5.

Provided in the lowermost region of the pressure chamber 5 is an inlet 5' for the admittance of fluid pressure into the pressure chamber 5.

The flexible diaphragm 3, as shown, comprises a peripheral end portion 7 which elastically deformed engages the inner wall 5a of the fluid pressure chamber 5 by means of an annular expansion ring 6. The expansion ring 6 is seen to comprise a cylindrical portion 6a which presses the end portion 7 which includes a peripheral outwardly projecting enlargement 9, against the inner wall 5a such that the peripheral enlargement is securely seated in a peripheral groove 5b in the inner wall 5a so as to tightly retain the diaphragm 3 in position.

The expansion ring 6 further comprises an inwardly arcuately curved guide portion 8 which faces towards the lower chamber 5 and which, preferably, has a semicircular cross section with a diameter which is about twice the wall thickness of the diaphragm.

Upon admittance of fluid pressure into the fluid pressure chamber 5 via inlet 5', the center portion 3a of the diaphragm 3 is deflected in direction towards and into the gas chamber 4, as a result of which the peripheral portion 3b of the diaphragm contacts the guide surface of portion 8 of the expansion ring 6 and is arcuately deformed into conformance with this guide surface whereby acute bending and breakage of the peripheral portion 3b is avoided.

Without further analysis, the foregoing will so fully reveal the gist of the present invention that others can, by applying current knowledge, readily adapt it for various applications without omitting features which fairly constitute essential characteristics of the generic and specific aspects of our contribution to the art, and, therefore, such adaptations should and are intended to be comprehended within the meaning and range of equivalence of the claims.

What is claimed as new and desired to be protected by Letters Patent is set forth in the appended claims.

1. A fluid-actuated device, particularly a pressure reservoir, comprising wall means defining an enclosed space; a diaphragm subdividing said enclosed spaced into two chambers and comprising a peripheral portion engaging said wall means and a center portion arranged to be deflected into one of said chambers in response to admission of pressure fluid into the other of said chambers; a single annular element comprising a cylindrical portion pressing said peripheral portion of said diaphragm into sealing engagement with said wall means and an adjacent portion integral with said peripheral portion and having an arcuately curved guide face extending radially inwardly from said cylindrical portion and facing said other chamber, said arcuately curved guide face having in an axial cross section of said annular element a diameter about twice the wall thickness of said diaphragm; and inlet means for admitting pressure fluid into the other of said chambers, whereby upon admitting of pressure fluid into said other chamber a portion of said diaphragm adjacent said peripheral portion contacts said guide face and is arcuately deformed to thereby avoid sharp bending between the peripheral portion and said center portion of said diaphragm, and said diaphragm is free of contact with said arcuately curved guide face and in contact with said wall means when the pressure in said one of said chambers overcomes the pressure in said other chamber.

2. A device as defined in claim 1, wherein said peripheral portion of said diaphragm comprises a lateral outwardly directed circumferential projection sealably received in a peripheral groove in said wall means in said other chamber to tightly secure said diaphragm in the same.

3. A device as defined in claim 1, wherein said annular element is an expansion ring.

* * * * *